(12) United States Patent
Ben Bakir et al.

(10) Patent No.: US 9,134,482 B2
(45) Date of Patent: Sep. 15, 2015

(54) POLARIZATION SPLITTING OPTICAL COUPLER HAVING AN INTERPOSED GUIDE SEGMENT EXTENDING BETWEEN FIRST AND SECOND COPLANAR WAVEGUIDES

(71) Applicant: Commissariat à l'énergie atomique et aux énergies alternatives, Paris (FR)

(72) Inventors: Badhise Ben Bakir, Grenoble (FR); Antoine Descos, Grenoble (FR); Alban Le Liepvre, Marcoussis (FR); Marco Lamponi, Marcoussis (FR); Guilhem De Valicourt, Marcoussis (FR); Guang-Hua Duan, Marcoussis (FR)

(73) Assignee: Commissariat à l'énergie atmoique aux énergies alternatives (FR)

( * ) Notice: Subject to any disclaimer, the term of this patent is extended or adjusted under 35 U.S.C. 154(b) by 143 days.

(21) Appl. No.: 13/893,980

(22) Filed: May 14, 2013

(65) Prior Publication Data

US 2013/0343695 A1    Dec. 26, 2013

(30) Foreign Application Priority Data

May 15, 2012  (FR) ...................................... 12 54441

(51) Int. Cl.
*G02B 6/26* (2006.01)
*G02B 6/126* (2006.01)
*G02B 6/122* (2006.01)
*G02F 1/01* (2006.01)
(Continued)

(52) U.S. Cl.
CPC .................. *G02B 6/26* (2013.01); *G02B 6/126* (2013.01); *G02B 6/1228* (2013.01);
(Continued)

(58) Field of Classification Search
CPC ................ G02F 1/0136; G02F 1/2257; G02F 2001/0144; G02F 2201/06; G02B 6/126; G02B 2006/12147; G02B 2006/12152; G02B 6/1228; G02B 6/26
USPC .................................. 385/2, 11, 12, 15, 16, 37
See application file for complete search history.

(56) References Cited

U.S. PATENT DOCUMENTS 4,998,793 A * 3/1991 Henry et al. ...................... 385/1
5,133,029 A * 7/1992 Baran et al. ..................... 385/11
(Continued)

FOREIGN PATENT DOCUMENTS

WO    2012066200 A1    5/2012

OTHER PUBLICATIONS

Sun, et al., "Adiabaticity criterion and the shortest adiabatic mode transformer in a coupled-waveguide system", "Optics Letters", Feb. 1, 2009, pp. 280-282, vol. 34, No. 3, Publisher: Optical Society of America, Published in: US.
(Continued)

*Primary Examiner* — Akm Enayet Ullah
(74) *Attorney, Agent, or Firm* — Kaplan Breyer Schwarz & Ottesen, LLP

(57) ABSTRACT

A coupler/splitter including two neighboring coplanar waveguide portions extending in a same direction, the first portion having a constant cross-section, the second portion having a variable cross-section so that the effective index of the second waveguide portion varies, in the upstream-to-downstream direction, from a first lower value to a second value higher than the effective index of the first portion, in adiabatic coupling conditions.

7 Claims, 3 Drawing Sheets

(51) Int. Cl.
 *G02B 6/12* (2006.01)
 *G02F 1/225* (2006.01)

(52) U.S. Cl.
 CPC ............... *G02B 2006/12147* (2013.01); *G02B 2006/12152* (2013.01); *G02F 1/0136* (2013.01); *G02F 1/2257* (2013.01); *G02F 2001/0144* (2013.01); *G02F 2201/06* (2013.01)

(56) References Cited

U.S. PATENT DOCUMENTS

| | | | |
|---|---|---|---|
| 5,208,697 A * | 5/1993 | Schaffner et al. | 359/254 |
| 6,400,856 B1 * | 6/2002 | Chin | 385/11 |
| 6,493,473 B1 * | 12/2002 | Wooten | 385/11 |
| 2005/0152648 A1 * | 7/2005 | Madsen et al. | 385/49 |
| 2008/0019637 A1 * | 1/2008 | Little et al. | 385/28 |
| 2008/0025665 A1 * | 1/2008 | Little | 385/30 |
| 2011/0116741 A1 * | 5/2011 | Cevini et al. | 385/28 |
| 2011/0150390 A1 * | 6/2011 | Meyer et al. | 385/31 |
| 2014/0056552 A1 * | 2/2014 | Okayama | 385/11 |

OTHER PUBLICATIONS

Xavier Orignac, "Related French Patent Application No. 12/54441 Search Report", Jan. 10, 2013, Published in: FR.

* cited by examiner

POLARIZATION SPLITTING OPTICAL COUPLER HAVING AN INTERPOSED GUIDE SEGMENT EXTENDING BETWEEN FIRST AND SECOND COPLANAR WAVEGUIDES

BACKGROUND

The present invention relates to the field of nano-optoelectronics. It more specifically relates to a polarization and/or wavelength splitter coupler.

DISCUSSION OF THE RELATED ART

Nanophotonics especially uses planar optical waveguides having a low or a high index contrast. Currently guides have a core made of silicon or of another semiconductor and a cover layer made of silicon oxide or nitride or of another dielectric.

The use of such planar guides enables to compactly integrate, on a same chip, complex optical functions such as multiplexing, demultiplexing, modulation, spectral routing, etc. Such functions may be dedicated to very short-distance optical connections at a millimeter scale (ex.: intra-chip communication) as well as for very long distance, on the order of several thousands of kilometers, via intermediate distance connections (ex.: access network). Further, such optical functions enable to process high-speed data, well adapted to solve problems due to the increase of interconnection bus speeds.

The following conventions and notations will be used in the present description. For an electromagnetic (optical) wave having electric field and magnetic field components, orthogonal to the propagation direction, propagating in an optical waveguide formed in a given plane, TE (transverse electric) and TM (transverse magnetic) polarization states are defined. In TE state (or considered as such when the field is mostly TE-polarized), electric field component E is parallel to the guide plane and, in TM state (or considered as such when the field is mostly TM-polarized), the electric field component is perpendicular to the guide plane. This is illustrated in FIG. 1 in the case of the TE polarization state. In this drawing, E designates the electric field, M designates the magnetic field, and G designates a waveguide.

A specific difficulty in the design and the forming of such waveguides is to control the polarization of light. Indeed, in an optical waveguide having an arbitrary aspect ratio, the two polarization states of an optical signal do not propagate, a priori, at the same speed (except if the guide cross-section is strictly square). It is then spoken of a polarization dispersion of the optical mode or, equivalently, of a birefringent optical waveguide.

Birefringence (B) is conventionally defined as being the difference between effective indexes $n_{TE}$ and $n_{TM}$ assigned to the TE and TM polarizations: $B = n_{TE} - n_{TM}$.

Two types of birefringent processes can mainly be noted in waveguides:

- the first one is a shape birefringence, noted $B_{form}$, due to the generally asymmetrical aspect ratio of the cross-section of a waveguide;
- the second one is a birefringence, noted $B_{mat}$, which is due to the material having the guide inscribed therein; it may be intrinsic as in the case of anisotropic materials or induced by guide manufacturing processes, for example, when the guide is formed on a substrate such as silicon on insulator (SOI), the stress which may appear at the interface generates an additional polarization dispersion process.

Generally, the predominating process is that which is associated with the aspect ratio of the guides, so that $B_{form} \gg B_{mat}$.

To form integrated optical/photonic circuits with a still higher performance, a component capable of orienting the polarization states in photonic sub-circuits should be designed, with optical functions dedicated to each of the polarizations, TE or TM. Indeed, for average and long-distance applications (from a few meters to several thousands of kilometers), the favorite optical wave transport means is the optical fiber. Unfortunately, the polarization state of an optical signal conveyed in a standard monomode optical fiber is a random quantity which continually changes along time. Further, an integrated photonic circuit is naturally very sensitive to polarization. For example, the coupling rate between an optical fiber and a planar guide depends on the polarization state. In receive mode, this sensitivity is incompatible with a direct connection of the circuit to the network of optical fibers where the polarization state is both unknown and continually variable. Accordingly, one of the very first needs is to develop circuits with a variety of polarizations wherein the TE and TM polarizations can be treated separately.

Another key element in a photonic circuit is a wavelength demultiplexer. Its function for example is to separate two wavelengths or two groups of wavelengths conveyed in a same guide towards two output guides.

FIG. 2A illustrates the principle of a polarization splitter or co-directional coupler with a waveguide. This drawing shows in top view two parallel coplanar waveguide portions 1 and 2. Waveguide 1 stops at a point 3 and waveguide 2 starts at a point 4. The coupling is achieved in an area where the two guides are juxtaposed in a plane (or coplanar).

FIG. 2B is a simplified cross-section view of a conventional embodiment of an optical waveguide. This waveguide is formed of a rectangular portion having a height h and a width w of a first material 6 surrounded with a second material having a different optical index for example comprising a support 7 and a coating layer 8. In a current embodiment, first material 6 is silicon and the support and coating 8 are made of silicon oxide. Generally, when several waveguides are formed in a same photonic circuit, all the waveguides may have different heights h and widths w.

In an isolated waveguide, one can define, for a wavelength $\lambda$, an effective index $n_{eff}$ and a propagation constant $\beta$ equal to $2\pi \cdot n_{eff}/\lambda$. However, in a coupled system, the coupling area underlies supermodes which are linear combinations of the local modes of the input and output guides, taken individually. Such supermodes are generally called even and odd modes. Electric field E is described by the following equation:

$$E(x,z) = E_{even}(x)e^{-j\beta_{even}z} + E_{odd}(x)e^{-j\beta_{odd}z}$$

$$|E(x,z)| = |E_{even}(x) + E_{odd}(x)e^{j(\beta_{even}-\beta_{odd})z}|.$$

At the coupler input, for z=0, the field is confined in the first guide so that:

$$|E_{in}| = |E_{even}(x) + E_{odd}(x)|$$

At the output, for $z = \pi/(\beta_{even} - \beta_{odd})$, the mode is confined in the second waveguide:

$$|E_{in}| = |E_{even}(x) - E_{odd}(x)|$$

The optimal coupling efficiency, F, is defined as being the power fraction transmitted from a first guide to a second guide at the end of a characteristic distance called coupling length $L_c$:

$$F = 1 - (\Delta n_{eff,L}/\Delta n_{eff,S})^2 \quad (1)$$

with $$L_c = \frac{\lambda}{2\sqrt{\Delta n_{eff,S}^2 + \Delta n_{eff,L}^2}} \quad (2)$$

where:
  λ is the operating wavelength.
  $\Delta n_{eff,L}$ is the difference between the effective indexes of the modes supported by the first and second guides in the absence of coupling (the guides are taken individually). Such guided modes are called local modes.
  $\Delta n_{eff,S}$ is the difference between the effective indexes of the modes supported by the coupling structure comprising the two juxtaposed guides. These two supermodes are of opposite symmetry by construction. It will then be spoken of symmetrical and antisymmetrical supermodes. This physical quantity depends on the distance which separates the two guides. It conditions the coupling length, $L_c$, as well as the transferred power rate.

It should be noted that the power transfer from one guide to the other is a harmonic process, which is thus reversible. Considering a nominal power, $P_0$, injected into the first guide, the collected or transmitted power $P_{1\to2}$ in the second guide at position z can be expressed as follows:

$$P_{1\to2}(z) = P_0 \cdot F \sin^2(\pi \cdot z/2L_c) \quad (3)$$

It should be noted according to relation (3) that the power transfer from the first guide to the second guide is optimal for odd multiples of the characteristic coupling length.

A way to couple a single polarization is to design a coupled system for which the ratio of the differences of effective indexes of the supermodes for each polarization state is very high; $\Delta n_{eff,S,TM} \gg \Delta n_{eff,S,TE}$, typically, which results in: $L_{cTM} \ll L_{cTE}$.

In these conditions, most of the polarization state of a guide can be coupled to another one while maintaining the other polarization state on the first guide. An example of possible result is illustrated in FIG. 3 where:
  the central portion illustrates a microscope view of a coupler 10 between two guide portions 1 and 2;
  the left-hand portion illustrates a simulation of the propagation of the TM polarization; it shows that, for an optimal coupling length, $L_c$, the TM mode is practically totally transferred from the first guide to the second one (the dark areas corresponding to the presence of the TM mode and the light areas corresponding to the absence thereof);
  the right-hand portion illustrates a simulation of the propagation of the TE polarization; it shows that this TE mode is not transferred from the first guide to the second one (the dark areas corresponding to the presence of the TE mode and the light areas corresponding to the absence thereof).

In the case of a coupling such as described hereabove between two identical guides, the effective indexes must be strictly identical to obtain a 100% optical coupling of the wave, which imposes a constraint on the definition of the width of the waveguides to match the effective indexes. The second constraint is that the optimal coupling can only be achieved over a specific distance, which is above-discussed beat length or coupling length $L_c$. If the length is smaller than $L_c$, the coupling will not totally be achieved. If the length is greater than $L_c$, the coupling will be performed over a distance $L_c$, after which the mode will partly decouple along the remaining distance (for a length $L=2*L_c$, the mode returns to its initial state).

There thus is a need, in optoelectronics, for a coupler/splitter overcoming at least some of the disadvantages of prior structures.

SUMMARY

An object of embodiments of the present invention is to provide a coupler/splitter having a particularly high conversion efficiency and which is little sensitive to variations especially resulting from manufacturing drifts.

Thus, an embodiment of the present invention provides a coupler/splitter comprising first and second coplanar waveguides of constant cross-section extending along a same direction, and an interposed guide segment extending between the first and second guides, the interposed guide segment having a variable cross-section so that its effective index varies, in the upstream-to-downstream direction, from a first lower value to a second value higher than the effective index of the first waveguide, the interposed guide segment being adiabatically coupled to the first guide in its upstream portion and to the second guide in its downstream portion.

According to an embodiment of the present invention, the side of the second portion close to the first portion is parallel to the adjacent side of the first portion.

According to an embodiment of the present invention, the side of the second portion close to the first portion is rectilinear.

According to an embodiment of the present invention, the side of the second portion distant from the first portion is rectilinear.

According to an embodiment of the present invention, the coupler/splitter comprises a plurality of interposed guide segments adiabatically coupled together.

According to an embodiment of the present invention, the first guide comprises, downstream of the first portion, a sinuous path.

According to an embodiment of the present invention, all the waveguides and waveguide portions have a same thickness, the cross-section variations corresponding to width variations.

The foregoing and other features and advantages of the present invention will be discussed in detail in the following non-limiting description of specific embodiments in connection with the accompanying drawings.

As usual in the representation of integrated optical or electronic circuits, the various drawings are not to scale.

DETAILED DESCRIPTION

Figure 1:
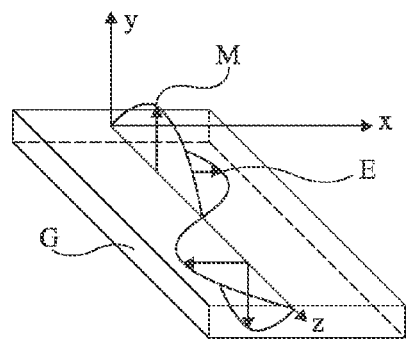
FIG. 1, previously described, illustrates a TE polarization mode in relation with a waveguide.
Figure 2A:
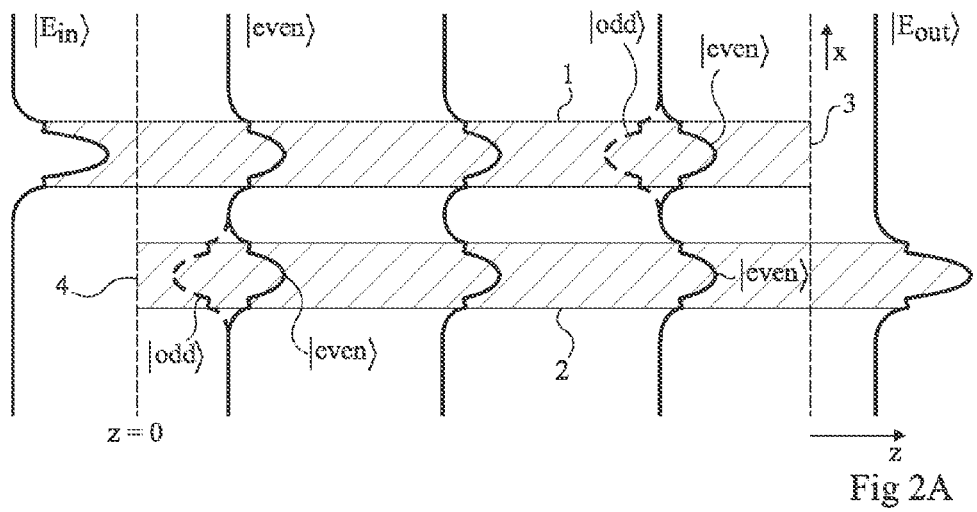
FIG. 2A, previously described, shows two parallel coupled waveguides as well as the shape of the modes propagating in these waveguides.
Figure 2B:
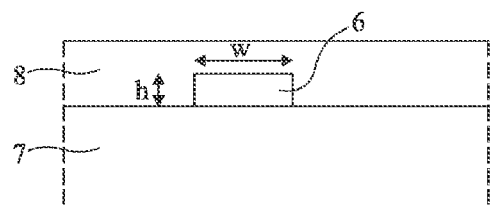
FIG. 2B, previously described, is a cross-section view of a waveguide.
Figure 3:
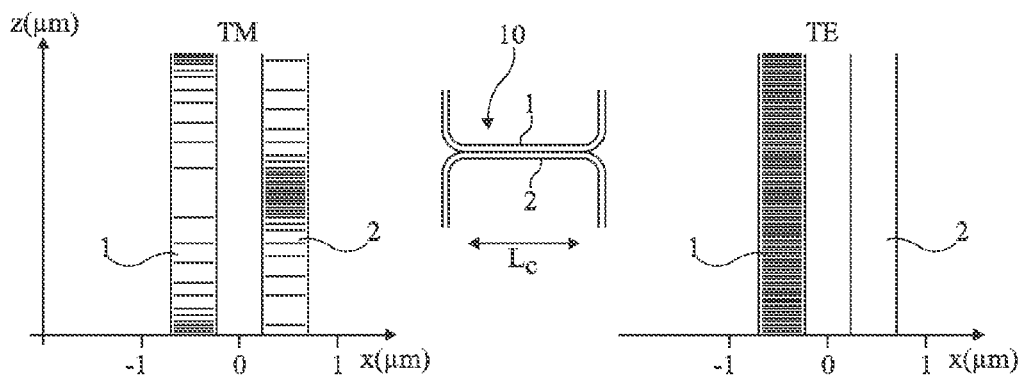
FIG. 3, previously described, illustrates at its center two coupled waveguides, in its left-hand portion the transfer of the TM mode from the first to the second guide, and in its right-hand portion the lack of transfer of the TE mode from the first to the second guide.
Figure 4:
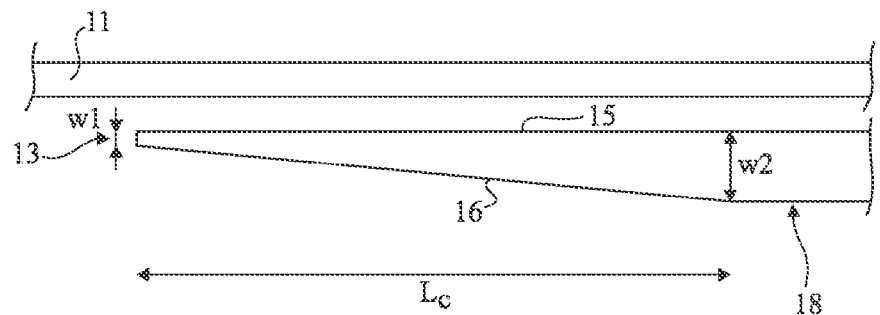
FIG. 4 is a top view of two waveguides coupled according to an embodiment of the present invention.

FIG. 4 shows an embodiment of a coupler/splitter such as provided herein. Such a coupler/splitter comprises two waveguides: a first waveguide 11 having a constant cross-section such as previously-described waveguides 1 and 2 and a second waveguide 13 which, in coupling portion $L_c$, has a variable cross-section, that is, a variable width in the conventional case where the core of this waveguide has a constant thickness. Beyond coupling area $L_c$, second waveguide 13 has a constant width.

Assuming that the light comes from the left (upstream side), the width variation of waveguide 13 along coupling length $L_c$ is selected so that this waveguide initially has a width $w_1$ smaller than the width of the first waveguide and that it has in the output area a width $w_2$ greater than the width of the first waveguide. As a result, the effective index in the upstream portion of the second guide is lower than the effective index in its downstream portion.

Further, the widening profile in coupling area $L_c$ is selected so that the mode transfer occurs in adiabatic conditions, for example, such as defined in Xiankai Sun, Hsi-Chun Liu, and Amnon Yariv's article published in Optics Letters, volume 34, N° 3 of Feb. 1, 2009. It should be noted that this article considers the coupling between two superposed waveguides while the present description aims at the case of two coplanar waveguides. Further, it relates to a specific design mode which provides an adiabaticity criterion for the shortest possible coupling length. Due to the compliance with the adiabaticity conditions, an optimal transfer of the TM polarization mode from the first guide to the second guide is obtained with coplanar waveguides and this transfer remains satisfactory even if the dimensions are not strict.

Thus, the main conditions to be respected to provide a transfer of the TM wave with no transfer of the TE wave are to provide a coupling area where there is an effective coupling index variation between upstream and downstream of the coupling area, the coupling length being selected so that the transfer is quasi-complete and the transfer of the TM mode is optimized. Further, the effective index of the first guide, in the coupling area, should be within the variation interval of the effective index of the second guide. As known, and as results from the above-mentioned article, these optimal dimensions cannot be set by analytic formulas, except for forms specifically described in Yariv's article. However, generally, and for convention forms (linear, exponential, polynomial), the coupling length is determined ex post facto by simulation.

In practice, length $L_c$ is set by simulation: the quantity of TM mode transferred to the second guide as it is moved in the downstream direction of the second guide is calculated, and the length corresponding to a maximum coupling of the TM mode is selected.

The coupling portion of the second guide comprising a first surface 15 close to the first waveguide and parallel to the opposite surface of this first waveguide has been shown, second surface 16 remote from the first waveguide being rectilinear and non parallel to that of the first waveguide. It should be noted that this embodiment is likely to have various alterations. According to a first variation, the first surface is not necessarily parallel to the opposite surface of the first waveguide, although this is a preferred embodiment since it gives a greater robustness (invariance with respect to variations of the manufacturing process) to the coupler/splitter. According to a second variation, second surface 16 is not rectilinear, but may have any selected contour and for example corresponds to a quadratic, exponential, or polynomial function of distance z to the origin of the coupler/splitter.

It should finally be noted that the second guide continues in a portion 18. This portion can remain parallel to the first waveguide. This has little influence on the operation of the coupler/splitter since, given that portion 18 is much wider than first waveguide 11, there is practically no coupling between waveguides in this area.

Figure 5:
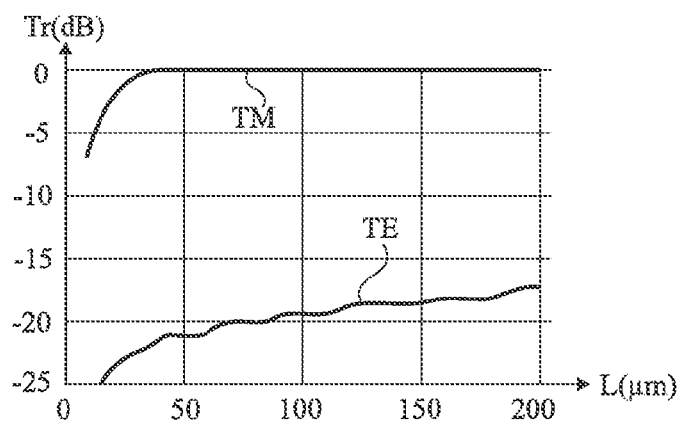
FIG. 5 shows transmission curves for coupled waveguides of the type in FIG. 4 for the TE mode as well as for the TM mode.

FIG. 5 illustrates the transmission rate in dB of the TM and TE modes from the first guide to the second guide for a coupler/splitter of the type in FIG. 4. Curve TM indicates that from a given coupling length (greater than approximately 30 μm the shown example), the practically unattenuated TM mode is present in the second guide. Curve TE indicates that the portion of the TE mode present in the second guide is very low, provided for the coupling length not to be excessive (smaller than 75 in the shown example). Indeed, as underlined by the above-mentioned Sun, Liu, and Yariv article in the last portion of its first paragraph "An adiabatic coupler, . . . , does not require a precise definition of power-transfer length but it has to be sufficiently long to satisfy the adiabatic condition to reduce the coupling of power into other unwanted modes".

Figure 6:
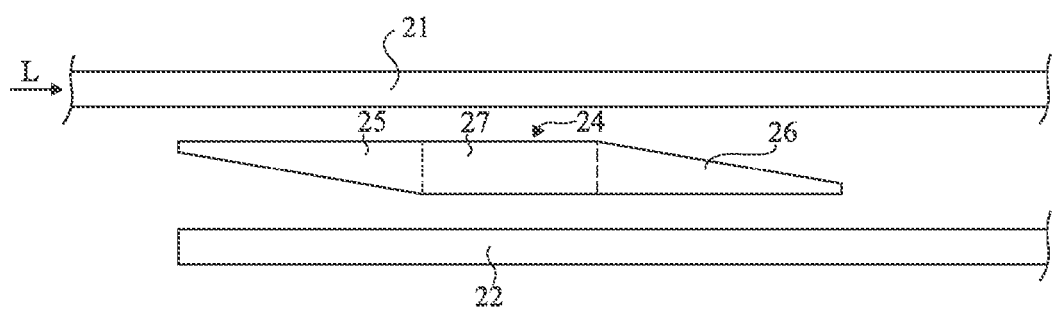
FIG. 6 shows a variation of a coupler according to an embodiment of the present invention.

FIG. 6 shows an alternative embodiment of an adiabatic coupler/splitter with coplanar guides. In this variation, two guides 21 and 22 of regular cross-section extend parallel to each other. Between these two guides is provided an interposed guide segment 24 having its left-hand portion comprising a coupling portion 25 similar to the coupling portion of length $L_c$ described in relation with FIG. 4, and having its right-hand portion comprising a coupling portion 26 symmetrical to the previous one, an intermediate parallel guide portion 27 being preferably interposed between coupling portions 25 and 26. Thus, when light L penetrates into waveguide 21 and comprises TE-polarized light and TM-polarized light, the TM-polarized light is transferred to coupling portion 25 and then passes through intermediate portion 27 into coupling portion 26 from which it is coupled towards guide 22. Guides 21 and 22 may have different cross-sections, guide 21 having a width optimized to promote the propagation of the TE mode and guide 22 having a width optimized to promote the propagation of the TM mode.

According to a variation, portion 27 may be absent. In this case, the two portions 25 and 26 are directly connected to each other.

Figure 7:
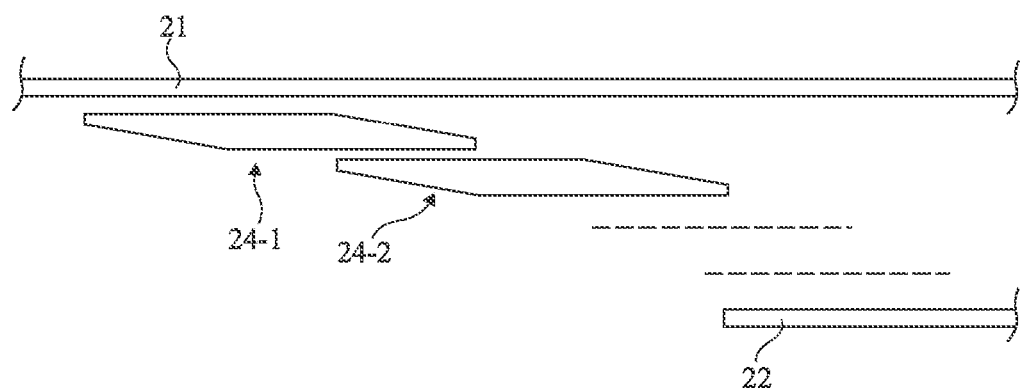
FIG. 7 shows another variation of a coupler according to an embodiment of the present invention.

According to an alternative embodiment illustrated in FIG. 7, the two guides 21 and 22 may be separated by a plurality of interposed coupling elements 24-1, 24-2 . . . , these interposed coupling elements promoting the passing from one to the other and then into guide 22 of the TM-polarized light penetrating into guide 21. This structure with several interposed guide segments especially has the advantage of decreasing the possible residual TE-polarized light transferred to guide 22. Indeed, if the first interposed element lets through a small proportion $\in$ of TE-polarized light towards the next element, this next element will only let through a proportion $\in^2$. If there are n−1 interposed elements, there will only be in final guide 22 a proportion $\in^n$ of TE-polarized light.

Figure 8:
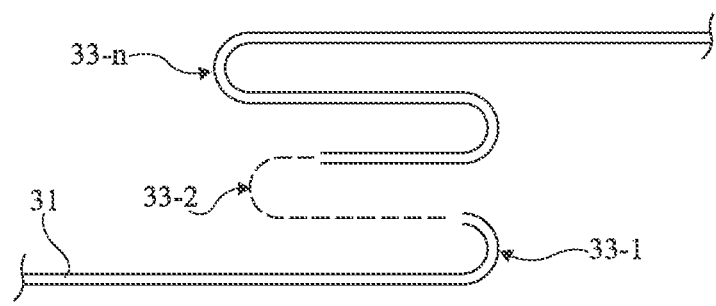
FIG. 8 shows a specific configuration of the waveguide after the coupling area.

FIG. 8 shows a specific configuration of a first guide 31 having received TE-polarized light and TM-polarized light, where the TM-polarized light has been transferred to another guide via a coupling system, not shown. There however remains a small portion $\in$ of TM light in guide 31. To further decrease this proportion, guide 31 comprises a series of turns 33-1, 33-2 . . . , 33-*n*. Indeed, it is known that for turns having a small radius of curvature, the TE-polarized wave is practically not attenuated while the TM-polarized light is strongly attenuated, for example, from 8 to 10 dB.

Specific embodiments of the present invention have been described. Various alterations, modifications, and improvements will occur to those skilled in the art. In particular, the present description has been made in the context of a polarization coupler/splitter. It should be noted that this coupler/splitter may also be used as a wavelength splitter in the case where the incident optical wave comprises two frequency components. In this case, the signal of the large wavelength will be transferred to another guide, while the signal of the small wavelength will remain in the input guide.

Various embodiments with different variations have been described hereabove. It should be noted that those skilled in the art may combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A coupler/splitter comprising first and second coplanar waveguides of constant cross-section extending along a same direction, and an interposed guide segment extending between the first and second guides, the interposed guide segment having a variable cross-section so that its effective index varies, in the upstream-to-downstream direction, from a first lower value to a second value higher than the effective index of the first waveguide, the interposed guide segment being adiabatically coupled to the first guide in its upstream portion and to the second guide in its downstream portion.

2. The coupler/splitter of claim 1, wherein the side of the interposed guide segment close to the first waveguide is parallel to the adjacent side of the first waveguide.

3. The coupler/splitter of claim 2, wherein the side of the interposed guide segment close to the first waveguide is rectilinear.

4. The coupler/splitter of claim 3, wherein the side of the interposed guide segment distant from the first waveguide is rectilinear.

5. The coupler/splitter of claim 1, comprising a plurality of interposed guide segments adiabatically coupled together.

6. The coupler/splitter of claim 1, wherein the first guide comprises, downstream of the interposed guide segment, a sinuous path.

7. The coupler/splitter of claim 1, wherein all the waveguides have a same thickness, the cross-section variations corresponding to width variations.

* * * * *